Aug. 24, 1965　　　C. S. WRIGHT　　　3,202,416
APPARATUS FOR PANEL BOARD ASSEMBLY
Filed Feb. 20, 1961　　　　　　　　　2 Sheets-Sheet 1
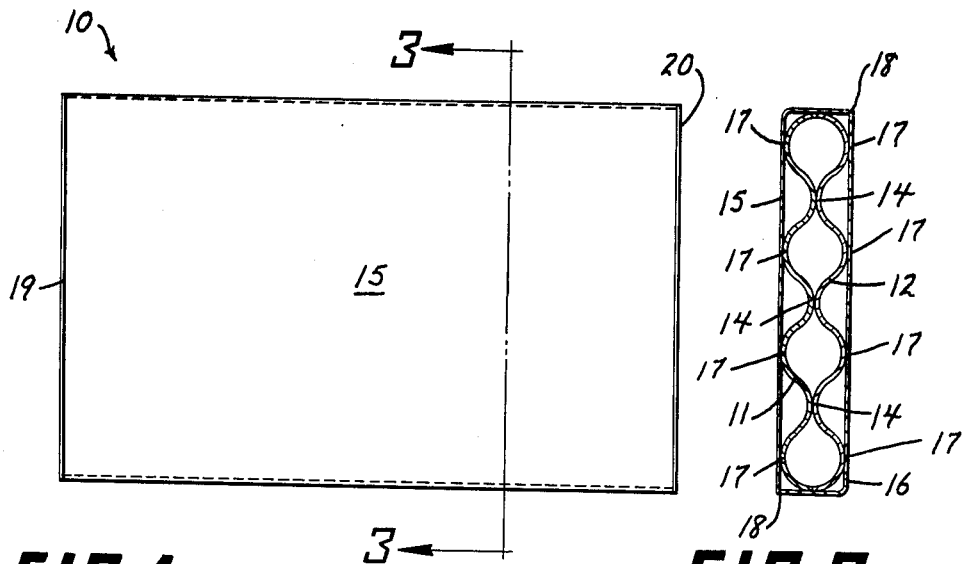
FIG. 1　　FIG. 3
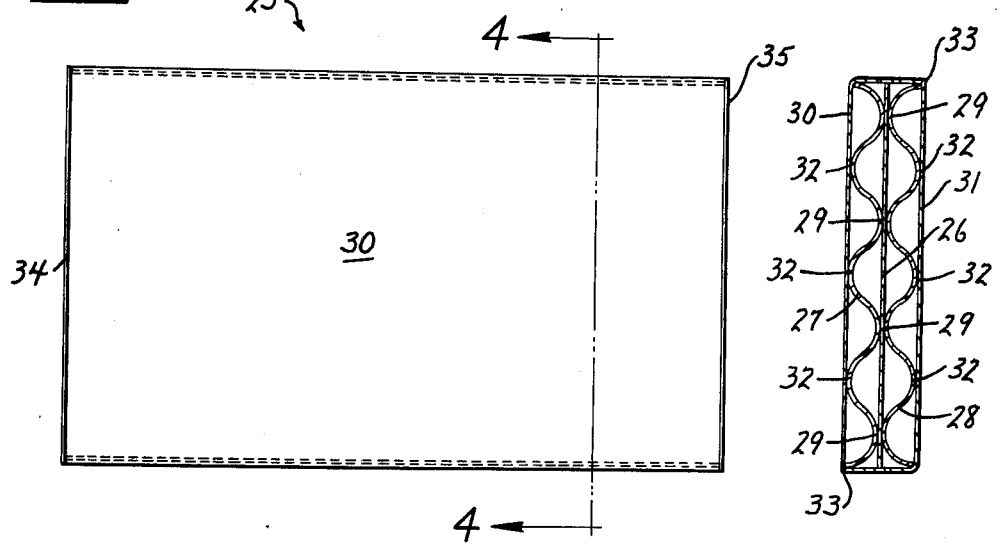
FIG. 2　　FIG. 4
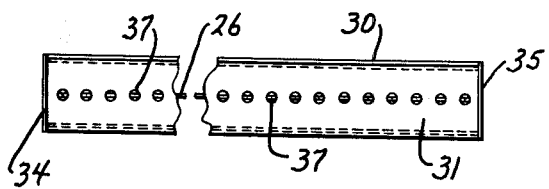
FIG. 5
INVENTOR.
CHESTER S. WRIGHT
BY
Attorney

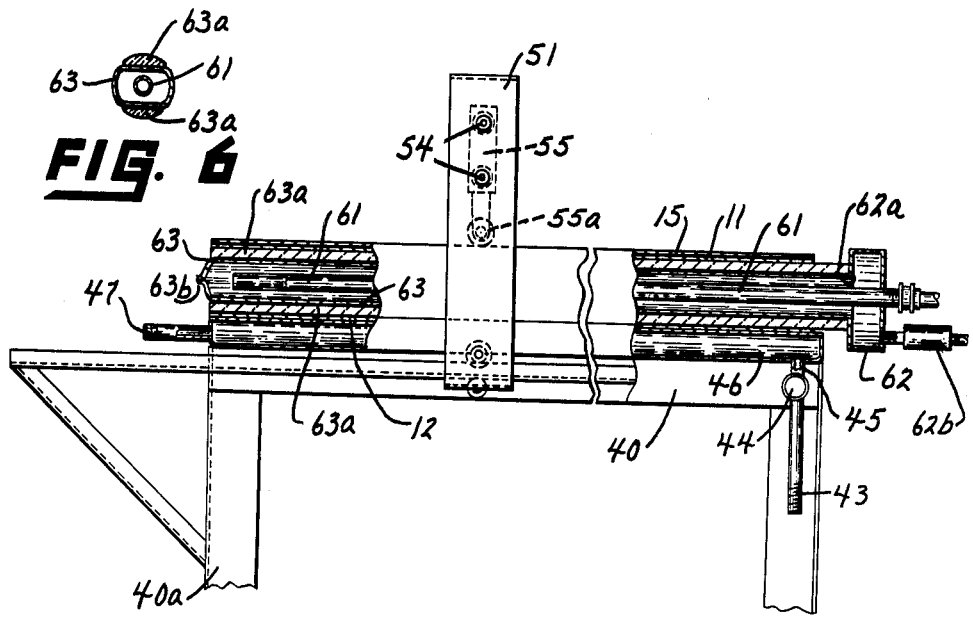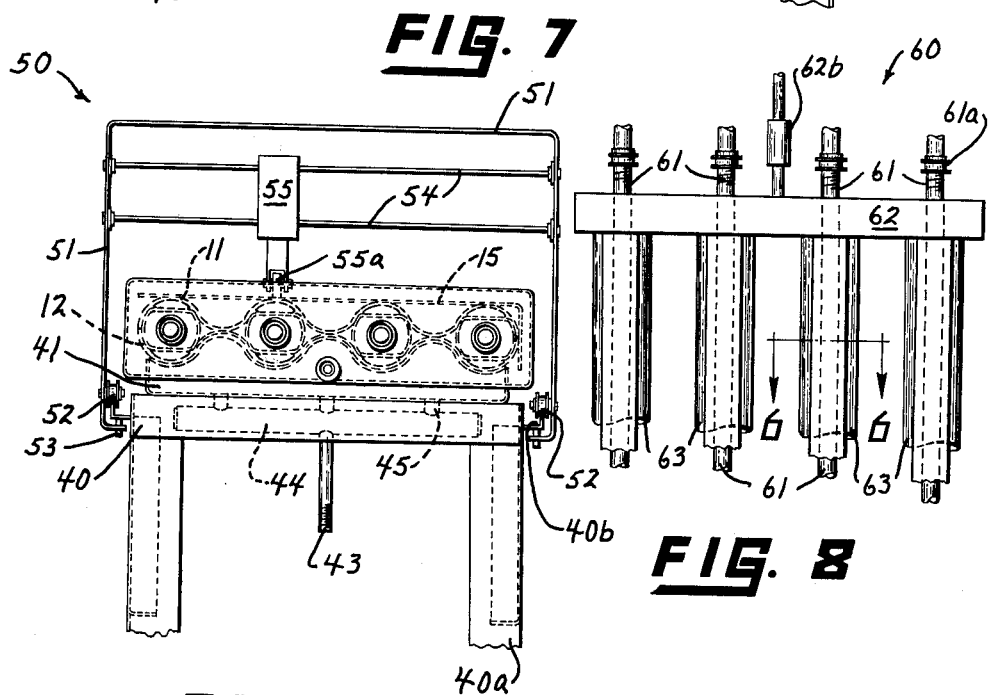

United States Patent Office 3,202,416
Patented Aug. 24, 1965

3,202,416
APPARATUS FOR PANEL BOARD ASSEMBLY
Chester S. Wright, 1000-B Caldwell Lane,
Nashville, Tenn.
Filed Feb. 20, 1961, Ser. No. 90,432
1 Claim. (Cl. 269—20)

The present invention relates to honeycomb panel board structures, and more particularly to a new and novel apparatus for the assembly of such structures.

Although the uses of metal panel boards for homes and for truck bodies, for example, are known, such prior metal panel boards have been heavy and often lacked in design strength. In addition, because of their weight, these prior metal panel boards were unwieldy in assembly, and, depending upon use, oftentimes oxidized internally and, hence, proved objectionable in this respect.

By virtue of the instant invention, the applicant has provided a new and novel apparatus for assembling metal panel board structures which are light in weight and yet which provide greater finished strength than possible with panel board structures in use heretofore. In addition, the instant panel boards may be vacuum sealed, hence eliminating the possibility of internal oxidation, as well as are self-supporting for their desired ultimate uses. The applicant's invention is particularly directed to apparatus for readily assembling the aforesaid panel boards where, broadly, a new and novel finger jig structure is provided to permit the assembly of the panel boards in a manner not possible heretofore. Additionally, through the applicant's novel method of assembly, the panel boards are rapidly and efficiently manufactured.

Accordingly, a principal object of the present invention is to provide a new and novel apparatus for assembling panel board structures.

Another object of the present invention is to provide a new and novel jig for panel board assembly which is simple in design and yet highly effective in use.

A further object of the present invention is to provide a new and novel apparatus for assembling panel boards in a rapid yet efficient manner.

A still further and more general object of the present invention is to provide a new and novel apparatus for producing panel board structures from lightweight metal which at the same time affords greater fabricated strength than existing types of panel boards.

Other objects and a better understanding of the instant invention will become more apparent from the following description, taken in conjunction with the accompanying drawings, wherein FIG. 1 is a plan view of one type of panel board made in accordance with the instant invention;

FIG. 2 is a plan view of an alternate type of panel board made in accordance with the instant invention;

FIG. 3 is a view in vertical section, taken at line 3—3 of FIG. 1 and looking in the direction of the arrows, showing details of one of the panel board designs;

FIG. 4 is a view in vertical section, taken at line 4—4 of FIG. 2 and looking in the direction of the arrows, showing details of the other of the panel board designs;

FIG. 5 is a view in side elevation, showing certain structural details of the panel board of FIGS. 2 and 4;

FIG. 6 is a view in vertical section, taken at line 6—6 of FIG. 8, showing details of the finger jig forming a part of the instant invention;

FIG. 7 is a view in side elevation, partly fragmentary, of the apparatus on which the panel boards of FIGS. 1 and 2 are typically produced in accordance with the instant invention;

FIG. 8 is a plan view, partly broken away, of the finger jig used in conjunction with the apparatus of FIG. 7; and, FIG. 9 is a view in end elevation of the panel board apparatus of FIG. 7.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring to FIGS. 1 and 3, a panel board 10 which typically results from following the teachings of the instant invention comprises two corrugated panels 11 and 12, seam welded together at 14, and having plate members 15 and 16 seam welded thereto at 17. Adjacent edges of the plate members 15 and 16 are welded to each other at 18, and end plate members 19 and 20 are provided to complete the assembly. In finished form, therefore, the panel board 10 typically comprises six assembled components.

FIGS. 2, 4 and 5 disclose another form of panel board 25, where, through a reinforcing member 26, a fabricated structure is provided which is readily adapted for heavy-duty uses. The panel board 25 of FIGS. 2, 4 and 5 typically comprise two corrugated members 27 and 28 seam welded to the reinforcing member 26 at 29, where plate members 30 and 31 are welded to the corrugated members 27 and 28 at 32 and to each other at 33. As in panel board 10 of FIGS. 1 and 3, end plate members 34 and 35 complete the assembly. In order to provide increased structural strength to the finished unit, and with particular reference to FIG. 5, a series of openings 37 are bored through the angled side portions of the plate members 30 and 31, and a series of spot welds, through the openings 37, join the aforesaid side portions of the plate members 30 and 31 with the edges of the reinforcing member 26.

The applicant's new and novel apparatus for assembling the aforedescribed panel board structures may be better understood with reference to FIGS. 6, 7, 8 and 9 of the drawings, where in FIGS. 7 and 9, a base 40 is disclosed having a water-cooled corrugated type copper jig 41 is disposed thereon. Typically, the base 40 is supported by legs 40a and fluid circulation is provided within the jig 41 through a water inlet 43, a header chamber 44, to which the water inlet 43 is connected, and a series of pipes 45 connecting the header chamber 44 to internal cavities 46 in the jig 41. A water outlet 47 is provided at the opposite end of the apparatus. The aforesaid structure is important to provide heat dissipation, during the welding operation, to be described herebelow.

Disposed on rails 40b extending from the side of the base 40 of the apparatus is a movable electric seam welding assembly 50, the latter having a framework 51 onto which wheels 52 are rotatably mounted. The wheels 52 typically ride on the rails 40b, while other wheels 53 rotatably mounted on the framework 51 engage the undersurface of the rails 40b, and thereby further position the seam welding assembly 50. Support members 54 extend between portions of the framework 51 and are adapted to receive a conventional seam welding element 55, the latter having a welding contact member 55a forming a part thereof. As should be apparent from the figures, the seam welding assembly 50 is movable longitudinally along the rails 40b on the base 40 of the apparatus, while the seam welding unit 55 is movable laterally along the support members 54 which extend between portions of the framework 51, both, thus, providing flexibility for welding operations.

In addition to the above, the applicant has provided a new and novel jig structure 60 which permits the ready assembly of the panel board designs of FIGS. 1 to 5, inclusive, where, with reference again to FIGS. 6, 7, 8 and 9, and more particularly to FIG. 8, the aforesaid jig 60 typically comprises a series of pipes 61 extending through a chamber 62. Each of the pipes 61 is surrounded by a tubing 63, typically made from canvas or plastic, for example, having a closed end 63b, to provide a closed passageway directly communicating with the chamber 62 through an opening 62a in the latter. Each of the respective tubings 63 forming the jig assembly, identified herebelow as "fingers," has a metal portion 63a, in the form of a tangential section in cross section, at the top and bottom thereof (see FIG. 6). The metal portion 63a, typically made from copper or similar conductive material, is secured to the tubing 63 by adhesive riveting, or like means. Depending upon the length of the respective pipes 61, a positioning element (not shown), typically in the form of a disc, may be disposed within each of the fingers to centralize the pipe 61 with reference to the tubing 63 therefor.

In use, water, or other coolant, is caused to pass into each of the pipes 61 through conventional coupling means 61a, and subsequently from the pipes 61 into the tubing 63, where it flows in a direction opposite to the incoming water, towards the chamber 62 and to an outlet 62b thereof. The water pressure causes the tubing 63 to expand and, hence, to assume the shape disclosed by FIG. 6. With the latter expansion of the tubing 63, the metal portions 63a thereof provide the necessary conductive contact for electric seam welding, as will be understood from the following discussion.

The applicant's new and novel method of assembling the panel boards of FIGS. 1 and 3 typically comprises placing the corrugated panel 12 onto the jig 41 found on the base 40 of the apparatus. As should be apparent from FIG. 9, the configuration of the aforesaid jig 41 and the corrugated panel 12 are complementary, i.e. are in a continuous point by point engagement. The corrugated panel 11 is then placed on the corrugated panel 12 and the movable electric seam welding assembly 50, and more particularly the seam welding element 55, is laterally positioned so that the welding contact member 55a thereof will, upon longitudinal movement of the seam welding assembly 50, define continuous linear welds at 14 (see FIG. 3). It should be understood, of course, that prior to welding, water or like fluid is circulated through the cooling system of the jig 41, as more particularly described hereabove.

When the corrugated panels 11 and 12 are assembled at the weld lines 14, the plate member 15 is disposed on the corrugated panel 11. In order to accomplish welding, a return electrical conductive path must be provided, and with this in mind, the applicant has invented the new and novel jig structure 60 discussed hereabove. In this connection, the jig 60 is so positioned that the pipes 61 thereof extend into the openings formed by the "peaks" defining the complementary corrugated panels 11 and 12. Water is then caused to flow through the pipes 61 into the casing 63, whereupon, as noted hereabove, the tubing or casing 63 expands and the metal portions 63a secured to the bottom and top thereof make firm contact with the inner surface of the "peaks" of the corrugated panels 11 and 12. The electric seam welding element 55 is then moved to a position proximate that shown by FIG. 9, for example, and the welding operation is initiated. It should be readily apparent from the above and from the drawings that the desired electrical conductive return path is provided through the metal portion 63a of each of the tubings 63. It might be noted that it is not necessary for both metal portions 63a, i.e., the upper and the lower portions of FIG. 6, to be on the tubing 63, but actually such is provided for convenience in use.

When the plate member 15 has been welded onto the corrugated panel 11 at 17, an auxiliary plate member (not shown) is disposed at top of the jig 41, and the plate member 15 is positioned thereon so that the corrugated panel 12 is on top. The preceding operation is then repeated to weld the plate member 16 onto the corrugated panel 12 at 17. The assembly operation is thereafter completed by welding the plate members 15 and 16 together at 18, and welding the end plate members 19 and 20 to the panel board assembly.

The applicant's new and novel apparatus for assembling the panel boards of FIGS. 2, 4 and 5 is similar in principle to that described hereinabove in connection with the panel boards of FIGS. 1 and 3. Briefly, the corrugated member 28 is placed on the jig 41, and the reinforcing member 26 is then positioned on the corrugated member 28. The other corrugated member 27 is disposed on the reinforcing member 26, and linear seam welding is thereafter effected at 29 through use of the above-described electric seam welding assembly 50. After the corrugated member 28, the reinforcing member 26 and the corrugated member 27 are welded together, the plate member 30 is positioned on the corrugated member 27.

As in the instance of the assembly of the panel boards of FIGS. 1 and 3, the applicant now employs his novel jig 60, where the fingers of the latter are inserted in the openings beneath the respective "peaks" of the corrugated member 27, and between the latter and the reinforcing member 26. In this instance, however, and if desired, the tubing 63 defining the fingers may be modified to include only a single metal portion 63a, with equally effective practice of the invention. In any event, upon the passage of water through the pipes 61 and the expansion of the tubing 63 so that the metal portion 63a thereof engages the inner surface of the "peaks" of the corrugated member 27, a return electrical conductive path is provided and, hence, linear welds can be achieved at 32 between the corrugated member 27 and the plate member 30.

In order to assemble the plate member 31 onto the corrugated member 28, the preceding process is repeated after an auxiliary plate member (not shown) is disposed on top of the jig 41, as described hereabove in connection with the panel boards of FIGS. 1 and 3. Subsequent to this phase of operation, the plate members 30 and 31 have their adjacent edges welded together at 33, and, as described hereabove, a series of spot welds through openings 37 afford the desired rigidity between the reinforcing member 26 and the shorter depending sides of the plate members 30 and 31. The assembly operation is then completed by the welding of the end plate members 34 and 35 thereon.

It should be understood that with the fabrication of either of the panel boards described hereabove, a vacuum is caused to be created within the assembled panel board by virtue of the temperature effect of the welding operation, thereby affording a finished product which is not subject to internal oxidation. Moreover, and by way of illustration, in a typical practice of the invention, 18 to 22 gauge metal is used for the panel board assemblies.

From the preceding it should be apparent that the applicant has provided a new and novel method and apparatus for assembling honeycomb panel board structures, and, particularly, to a new and novel jig which provides the necessary electrical return path to permit the electric seam welding thereof. The applicant's invention permits the rapid and effective assembly of panel boards of various designs.

It should be understood that the new and novel apparatus described hereabove is susceptible to changes within the spirit of the invention. Aside from normal changes in dimensioning, other materials and substitute structural relationships may be employed. For example, where a curved panel is to be formed, pipe 61 would be flexible. Thus, the above description should be considered illustrative and not as limiting the scope of the following claim.

I claim:

A jig for a panel board assembly having a corrugated member comprising, in combination, a plurality of fingers adapted to be inserted within spaces defined by corrugations of said corrugated member, each of said fingers having a collapsible outer surface with a conductive portion thereon, fluid carrying means extending within each of said collapsible outer surfaces of said fingers to a point proximate the end thereof, the space in each of said fingers between the inside of said collapsible outer surface and said fluid carrying means communicating with a common chamber, and means circulating fluid through a circulation path in said jig including said fluid carrying means, said space between said fluid carrying means and the inside of said collapsible outer surface in each finger, and said chamber to effect selective engagement of said conductive portion on each of said collapsible outer surfaces of said fingers with the inner surface of each corrugation.

References Cited by the Examiner

UNITED STATES PATENTS

| | | | |
|---|---|---|---|
| 1,710,258 | 4/29 | Hume | 219—160 XR |
| 1,776,731 | 9/30 | Ipsen et al. | 219—160 XR |
| 1,846,438 | 2/32 | Richter et al. | 219—160 |
| 2,004,787 | 6/35 | Gillette | 219—160 |
| 2,042,721 | 6/36 | Loewy | 189—34 |
| 2,445,801 | 7/48 | Partiot | 219—117 |
| 2,634,697 | 4/53 | Nofzinger | 113—99 |
| 2,778,458 | 1/57 | Briggs | 189—34 |
| 2,944,504 | 7/60 | Herman et al. | 113—99 |
| 3,077,532 | 2/63 | Campbell | 219—117 |

CHARLES W. LANHAM, *Primary Examiner.*

JOEL REZNEK, JOHN F. CAMPBELL, *Examiners.*